United States Patent [19]

Levy

[11] 4,217,494
[45] Aug. 12, 1980

[54] ISOTOPE SEPARATION WITH IMPROVED SELECTIVE IONIZATION

[75] Inventor: Richard H. Levy, Boston, Mass.

[73] Assignee: Jersey Nuclear-Avco Isotopes, Inc., Bellevue, Wash.

[21] Appl. No.: 328,967

[22] Filed: Feb. 2, 1973

[51] Int. Cl.[2] .......................................... H01J 39/34
[52] U.S. Cl. .................................. 250/282; 250/281; 250/288
[58] Field of Search ............... 250/281, 282, 288, 423, 250/424, 425

[56] References Cited

U.S. PATENT DOCUMENTS

| 2,938,116 | 5/1960 | Benson et al. | 250/287 |
| 3,294,970 | 12/1966 | Jenckel | 250/423 |
| 3,443,087 | 5/1969 | Robieux | 250/424 |
| 3,478,204 | 11/1969 | Brubaker et al. | 250/423 |
| 3,740,552 | 6/1973 | Pressman | 250/424 |
| 3,772,519 | 11/1973 | Levy et al. | 250/288 |

Primary Examiner—James W. Lawrence
Assistant Examiner—B. C. Anderson
Attorney, Agent, or Firm—Weingarten, Maxham & Schurgin

[57] ABSTRACT

Method and apparatus for isotope separation by selective ionization of a desired isotope in an environment of plural isotopes without corresponding ionization of the other isotopes in the environment. The selective ionization is achieved through a three step excitation of atoms of the desired isotope in response to laser radiations applied to the environment. The transition for each step is selected to be less than one half the ionization potential for the isotopes to avoid two step nonselective ionization.

27 Claims, 5 Drawing Figures

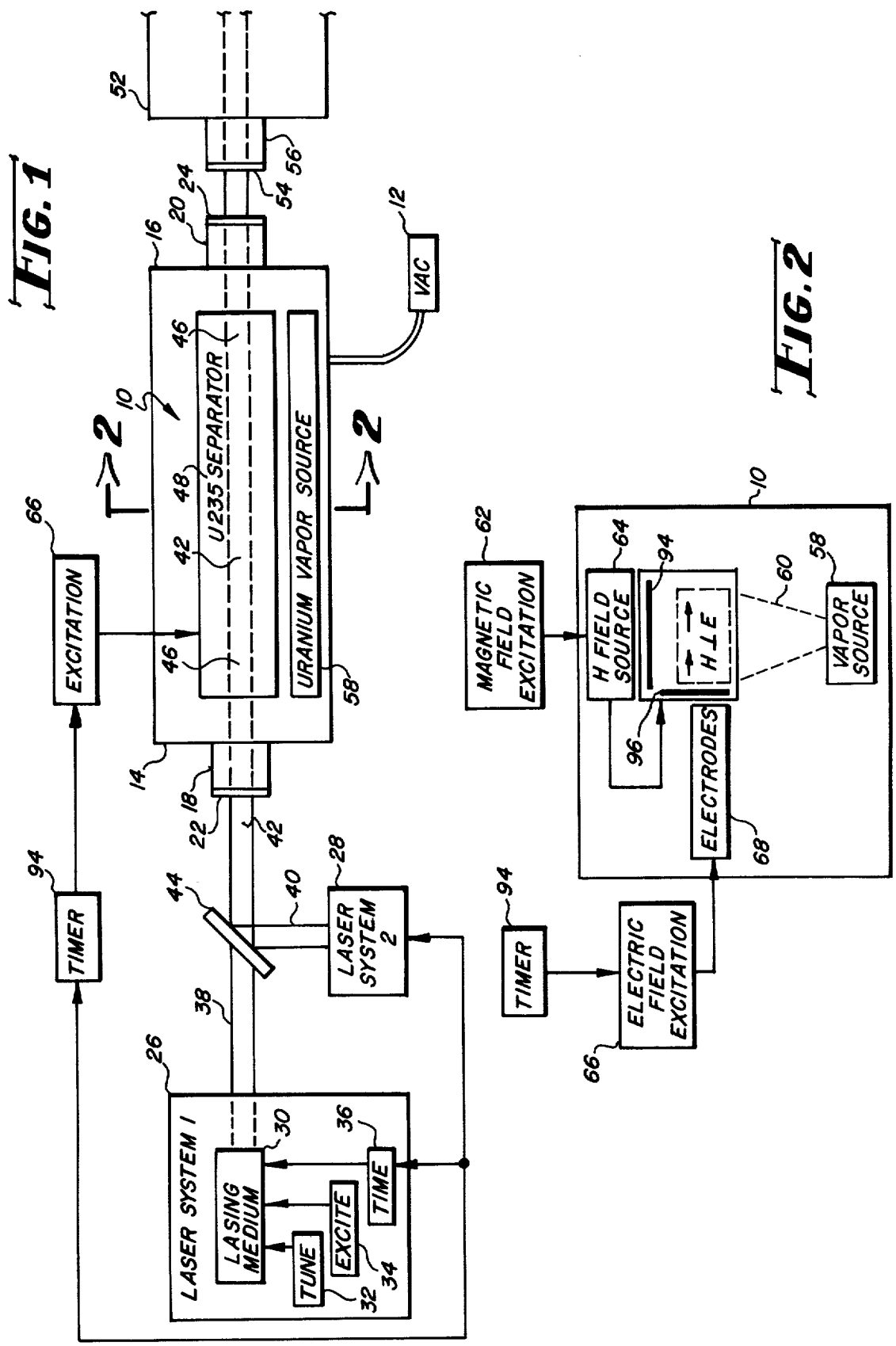

ISOTOPE SEPARATION WITH IMPROVED SELECTIVE IONIZATION

FIELD OF THE INVENTION

This invention relates to isotope enrichment and in particular to an improved method and apparatus for the selective ionization of a desired isotope with reduced ionization of other isotopes to provide the desired isotope with a characteristic which permits its separation.

BACKGROUND OF THE INVENTION

Nearly all fission reactions utilizing the uranium isotope, $U_{235}$, require a concentration of the $U_{235}$ isotope greater than in the naturally occurring state. The process of enrichment whereby the concentration of $U_{235}$ in natural or depleted uranium is raised to a desired level has been achieved in the past by many techniques which generally operate to separate $U_{235}$ from the other uranium isotopes, chiefly $U_{238}$, on the basis of its slight chemical or mass difference. Enrichment according to these techniques often requires cascaded processing using a sequence of repeated applications of the same steps, each step providing a slight increase in the concentration of the desired $U_{235}$ isotope.

A promising technique for more efficiently separating the $U_{235}$ isotope operates by selectively ionizing this isotope in a vapor of uranium without correspondingly ionizing the $U_{238}$ isotope in the vapor. The ionization gives to the desired $U_{235}$ isotope an electrical characteristic which permits it to be separated from the rest of the components of the uranium vapor. The selective ionization may be provided by illuminating uranium vapor with laser radiations in which at least one laser radiation has a frequency and narrow bandwidth selected to correspond to a specific energy step for the desired $U_{235}$ isotope but not the other isotopes of uranium, chiefly $U_{238}$. From this intermediate energy level the excited $U_{235}$ isotope is illuminated with further laser radiation to cause a transition into the ionized state which has a continuous range of possible energy levels.

In using this technique, it is generally possible that the photon energy in at least one of the laser radiations may or must, depending on the process, exceed one half of the energy of ionization for uranium, approximately 6.2 electron-volts (ev). Two photons from that radiation would then be capable of completely ionizing a uranium atom. In the situation where the radiation having more than half of the ionization energy is not finely tuned in frequency and limited in bandwidth, as is typically the case for the radiation producing the final ionizing step, it is possible to excite significant quantities of the undesired $U_{238}$ isotope to a first real, intermediate energy level from which a subsequent photon from the same radiation can produce ionization. In the case where the finely tuned laser radiation has more than one half of the ionizing energy, it is substantially less probable that the $U_{238}$ isotope would be excited to a real intermediate energy level, but there is a significant probability for ionizing that $U_{238}$ isotope in a two step process employing an intermediate, virtual energy level. Even a low probability for ionization of the undesired $U_{238}$ isotope, considering its far greater abundance and the extremely small concentration of the $U_{235}$ isotope, can lead to a significant lowering of the separation efficiency.

BRIEF SUMMARY OF THE INVENTION

It is to provide an improvement over the above situation that the method and apparatus of the present invention is provided. In accordance therewith, a system is described for the selective ionization of one isotope in an environment containing plural isotopes by using a three energy step ionization scheme with the energy of each step selected to avoid two-photon ionization of the other isotopes and accordingly increase the concentration of the desired isotope in the ionized state. More specifically, the system of the present invention provides for the illumination of the environment with first and second laser beams of such energy characteristics that at least three photons are required to ionize any of the isotopes.

In a typical application for the present invention, naturally occurring uranium is enriched in the $U_{235}$ isotope by ionizing that isotope without corresponding ionization of the other isotopes, primarily $U_{238}$, and by separately collecting the $U_{235}$ isotope after ionization thereof. In order to achieve selective ionization, a first laser radiation having a frequency, and corresponding energy, in the relatively high power and high efficiency red-orange region of the visible emission range is finely tuned to emit radiation in a narrow frequency band which will excite the atoms of the $U_{235}$ isotope to a discrete energy level below ionization but for which atoms of the $U_{238}$ isotopes have no corresponding discrete transition. The frequency for the first laser is selected so that the corresponding photon energy is significantly below one half the ionization potential for uranium. At least three photons of the first laser radiation alone would then be required to produce ionization of either isotope, a highly unlikely event.

A second laser provides radiation with a photon energy also significantly below one half the ionization energy for uranium and generally of a frequency corresponding to a discrete transition between the first excited state of the $U_{235}$ isotope and a second excited state at an energy level below ionization. The frequency for the second laser is also typically selected in the relatively high efficiency red-orange region such that a high photon density is applied to the uranium vapor. The high photon density permits a practical two-photon interaction with the excited $U_{235}$ atoms to produce ionization thereof in two equal energy steps. In order to ionize the $U_{238}$ or other isotopes, which are generally at or near the ground state, with radiation from the second laser, a three-photon reaction having a relatively low probability of occurrence is necessary. While some $U_{238}$ atoms may have been excited to higher energy levels where a two-photon ionization reaction is possible, in practice the amount of $U_{238}$ ionized in this manner is relatively small. Accordingly, the characteristics of the radiation from the second laser are also effective in reducing the degree of ionization of $U_{238}$ and other undesired isotopes.

BRIEF DESCRIPTION OF THE DRAWINGS

These and other features of the present invention will be more clearly understood by reference to a detailed description of the preferred embodiment presented below for purposes of illustration, and not by way of limitation, and to the accompanying drawings of which:

FIG. 1 is a diagrammatic view of a system for providing selective isotope ionization according to the invention;

FIG. 2 is an interior sectional view of the system of FIG. 1 along the section lines shown there;

DETAILED DESCRIPTION OF THE PREFERRED EMBODIMENT

Figure 3:
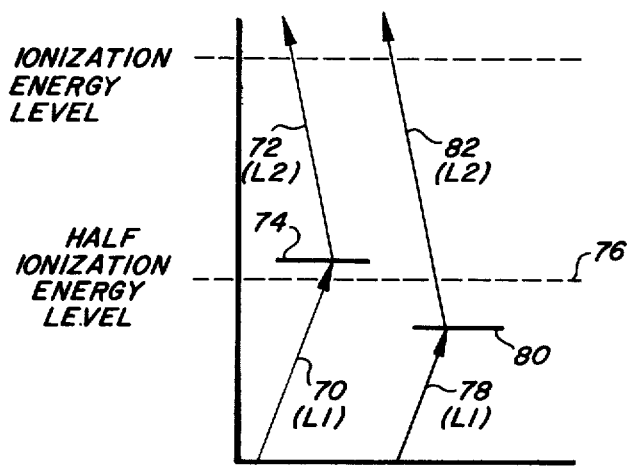
FIG. 3 is an energy level diagram representing a typical technique for providing isotopically selective ionization.

The features of the present invention, while applicable to isotope separation in general, provide particular benefit in the separation or enrichment of the $U_{235}$ isotope of uranium. The selective ionization system for this and other applications will be best understood in the context of the typical apparatus which may be employed for uranium enrichment or separation and which is shown in detail in FIGS. 1 and 2. A detailed physical diagram of similar apparatus over which this invention represents an improvement is indicated in French Pat. No. 71.14007 granted Jan. 10, 1972 (Publication No. 2.094.967) and specifically incorporated herein by reference.

Referring now to FIG. 1 for the details of the apparatus for the invention, a vacuum chamber 10 is shown as having an evacuation system 12 to maintain a relatively low pressure within the chamber 10 to prevent interference with the operation of the system by atmospheric constituents as will be made clear below. The chamber 10 is shown as relatively elongated and has extending from opposing end plates 14 and 16, respective pipes 18 and 20 which are sealed at their respective ends by windows 22 and 24. The windows 22 and 24 are substantially transparent to the radiation frequencies employed in the invention, and may be made of quartz crystal.

Radiant energy which may include one or more frequencies is provided for use in the invention by first and second laser systems 26 and 28, which are typically tunable dye lasers. As shown for system 26, each laser system typically comprises a lasing medium 30, a tuning system 32 to control the frequency output of the medium 30, an excitation system 34 to pump the medium 30, and a timing control 36 to initiate the beam output. Both laser systems 26 and 28 may typically be the "Dial-A-Line" lasers which are manufactured and sold by the AVCO Everett Research Laboratory, Everett, Mass. 02149, and further described in U.S. Pat. No. 3,684,979. Should minor modification of this commercially available laser system be necessary in order to obtain an appropriate narrow band of radiation, this may be accomplished by using a conventional etalon filter.

Collimated beams 38 and 40 of laser radiation emanate from respective laser systems 26 and 28 and are combined into a single beam 42 by a dichroic mirror 44. Beam 42 enters the vacuum chamber 10 through the window 22 and pipe 18 and traverses an interaction region 46 within a $U_{235}$ separator 48 to exit the chamber 10 through the opposite window 24 on pipe 20. As indicated in the above referenced French patent, it may be desirable to add a series of aligned chambers such as represented by additional, partially shown chamber 52 with window 54 and pipe 56 positioned along the line of the laser beam 42 to provide more complete utilization of the energy in that beam.

In implementing the invention each laser system 26 or 28 may include several stages of amplification as is known in the art. These can be provided typically by additional lasers for which the previous stage acts as excitation.

Within the vacuum chamber 10, and as can be more clearly seen in FIG. 2, a uranium vapor source 58 is provided for generating uranium vapor from metallic uranium by heating thereof as typically shown in the above referenced French Pat. No. 71.14007. The vaporized uranium as there indicated will have a drift velocity as it leaves source 58 and by disclosed collimation is produced as a beam 60 directed into the interaction region 46 encompassed by the $U_{235}$ separator 48. The vapor source 58 may include for the purpose of vaporizing the uranium a heated cauldron and collimator slits as indicated in the French patent or use a radiant oven heater or induction heater as desired. The evacuation of chamber 10 inhibits combustion of the vapor or deflection of its drift.

The $U_{235}$ collector 48 will typically use crossed-field MHD accelerator techniques as indicated in the French patent to collect the $U_{235}$ atoms after their selective ionization in the uranium vapor. For this purpose a magnetic field excitation source 62 provides field current to a magnetic field source 64, such as coils, to provide a generally constant and uniform magnetic field in a selected direction within the interaction region 46. Similarly, an electric field excitation source 66 provides a pulse of voltage to electrodes 68 placed to generate a short duration electric field within the region 46 orthogonal to the magnetic field so as to accelerate ions within the region 46 toward a collection plate 96 within the $U_{235}$ separator 48. A plate 94 collects the remaining components of the vapor beam 60.

The interaction of the laser beam 42 with the uranium vapor in the region 46, as will be explained below, produces ions of $U_{235}$ which will exist in the ionized state for at least a short interval during which time the electric field is applied to accelerate the ions. The considerations which affect the magnitudes of the magnetic and electric fields, the duration of the electric field and the geometry of the $U_{235}$ separator 58 include the kinetic mean free path of the accelerated ions limiting the distance to the $U_{235}$ collection plate so as to avoid deflection of accelerated ions, and the mean charge exchange reaction distance which limits the duration of the electric field to approximately the microsecond range so that the ion charge is not transferred to a neutral particle of $U_{238}$ while acceleration forces are still in effect. As shown in above referenced French patent typical magnetic field strengths are between 100 and 1000 gauss, while the electric field may be correspondingly chosen to accelerate the ions of $U_{235}$ to a velocity generally orthogonal to the velocity of beam 60 toward the collection plate for that isotope and consistent with the other considerations. It is to be noted that these considerations do not prescribe a specific geometry for the $U_{235}$ separator and it should not be assumed that the invention is necessarily associated with any particular geometry or separator concept.

Having indicated typical apparatus for practicing the invention, the improved technique for selectively ionizing the $U_{235}$ isotope of uranium to permit its separate collection apart from the other isotopes such as $U_{238}$ can be understood.

The typical interaction of laser radiations to achieve selective ionization without the improvement of this invention is indicated in FIG. 3 and comprises at least two energy steps. In a first case represented by energy steps 70 and 72 induced by radiations from laser systems 26 and 28 respectively, the energy of each photon in the beam 38 of laser system 26 from the transition 70 to an energy level 74 will be greater than one half the energy of ionization as represented by energy level 76. In that case the transition 72 which achieves ionization can be produced with photons which may have less than one half the energy of ionization. In a second case the energy of photons produced by laser system 26 for a transition 78 to an excited state represented by energy level 80 is less than one half the ionization energy while the second laser system 28 produces a transition 82 with photon energies which must exceed one half the energy of ionization.

Figure 5:
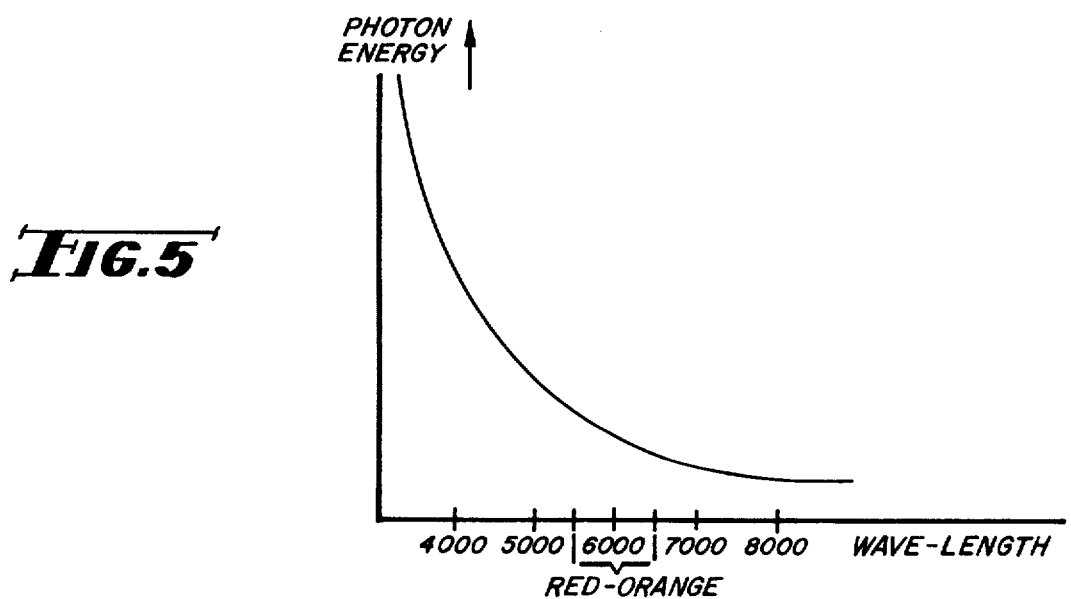
FIG. 5 is photon energy versus wavelength chart useful in explaining the invention.

A brief summary here of the terminology and units employed in this art should be useful. The energy levels of an atom above the zero ground level or unexcited state are conventionally expressed in electron volts (ev). For uranium the energy necessary to ionize an atom from the ground state is approximately 6.2 ev. In describing the photon energy of radiations it is also common to use the electron volt although more recently it has become conventional to use the unit of the wave number, defined as the number of wavelengths of radiation at that photon energy per centimeter. Since photon frequency and photon energy are related to Planck's constant according to quantum theory as shown in FIG. 5 there is a direct proportionality between energy and wave number. Expressed in wave number units, the ionization energy of uranium is approximately 50,000 $cm^{-1}$; one half that energy is 25,000 $cm^{-1}$. Additional conventions applicable here include the use of the term transition to include one or more energy steps or changes and to consider particles as including atoms or molecules.

Typically, laser system 26 in producing the transitions 70 and 78 will be finely tuned with a narrow bandwidth to a specific frequency and energy in order to excite the $U_{235}$ isotope at one of its known absorption lines without producing appreciable radiation at a frequency corresponding to absorption lines for the $U_{238}$ isotope. Laser systems such as the above referenced "Dial-a-Line" laser with or without amplification may be so tuned. The energy steps 72 and 82 for ionization are typically not selective in tune but since levels 74 and 80 are populated by a substantially greater proportion of $U_{235}$ atoms than in the pre-ionization vapor, the ionized atoms will be substantially richer in $U_{235}$. The interaction cross-section for ionizing the uranium atoms from excited levels 74 and 80 is substantially smaller than the cross-section for the initial excitation steps and accordingly a higher power laser, one producing a greater density of photons in the emitted radiation, is desirable to increase the ionization rate for the excited uranium atoms so that all selectively excited atoms may be ionized.

Referring now to case 1 in which the laser system 26 produces transition 70 having an energy change greater than one half the ionization energy and a transition 72 typically with an energy change less than one half the ionization energy, it can be seen that two photons from the first laser will in combination possess sufficient energy to completely ionize atoms of either isotope in the uranium vapor. While the first laser has been preferably tuned to a narrow spectral width to which the uranium isotope $U_{238}$ is not sensitive, it is possible, particularly with the relatively large cross-section of interaction from the ground state, that two photons co-act on an atom of $U_{238}$ to completely ionize the atom through an intermediate, virtual energy level as distinguished from a real energy level represented by the levels 74 and 80 to which the $U_{235}$ atoms would be typically elevated. While the mechanism of this two-photon interaction is not fully understood, the phenomenon of complete two-photon ionization of the $U_{238}$ atom in response to radiation at a frequency outside an absorption line for that isotope has been experimentally noted. Since the $U_{238}$ isotope is overwhelmingly more abundant that the $U_{235}$ isotope, even a small tendency for this two-photon interaction will reduce the degree of enrichment achieved.

In addition, since the energy of each photon in the beam 38 of laser system 26 will exceed 25,000 $cm^{-1}$, or one half the ionization energy for uranium, the radiation frequency produced by laser system 26 will lie in the blue or near ultraviolet portions of the spectrum where present laser technology provides relatively lower efficiency tunable lasers as compared to lower frequencies and energies corresponding to the red-orange portion of the spectrum. Moreover, the lifetime for an excited atom generally decreases as the energy level of the state increases. Thus the lifetime for a uranium atom in the state produced by relatively large transition 70 is substantially lower than the lifetime for a uranium atom in a lower energy level excited state reached with a smaller energy step such as transition 78 in the second case.

With regard to the second case illustrated in FIG. 3, it is apparent that the ionization energy step 82 must exceed one half the energy of ionization for uranium from its ground state since transition 78 is less than one half the energy of ionization. Accordingly, it is possible for two photons in the radiation from the second laser system 28 to produce complete ionization of the $U_{238}$ isotope from the ground state through a virtual energy level. Because of the lower-cross-section for interaction in the ionization transition 82 than the excitation transition 78, the density of photons and the power of the beam from the second laser system 28 is desirably increased and this will increase the probability for a two-photon ionization of the $U_{238}$ isotope.

Figure 4:
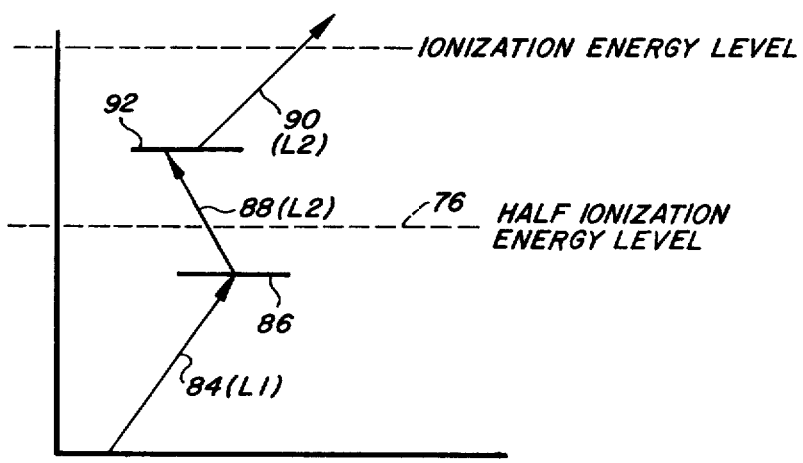
FIG. 4 is an energy level diagram illustrating the operation of the isotopically selective ionization technique according to the present invention.

With reference now to FIG. 4, an improved ionization reaction is shown which produces, with a three energy step technique, selective ionization of the $U_{235}$ isotope and which avoids a high probability for a multiple photon ionization of the unwanted $U_{238}$ isotope. This reaction, as indicated in FIG. 4, requires at least three photons for ionization of either the desired $U_{235}$ isotope or undesired $U_{238}$ isotope. The system is operated to particularly promote the $U_{235}$ ionization reaction so that a three-photon interaction with the $U_{238}$ isotope, using for example a virtual energy level, has an extremely low probability. Thus the overall separation as measured by the ratio of ionized $U_{235}$ to ionized $U_{238}$ divided by the ratio of non-ionized $U_{235}$ to non-ionized $U_{238}$ in the vapor is improved.

In specific implementation, the first laser system 26 of FIG. 1 is finely tuned to an absorption line for $U_{235}$ in the red-orange portion of the visible spectrum as indicated in FIG. 5, to produce a first transition 84 to a level 86 below the level 76. Appreciable excitation of $U_{238}$ in an adjacent absorption line is prevented by the narrow bandwidth of the laser radiation from system 26, using where necessary an etalon filter. A typical absorption line for $U_{235}$ to produce transition 84 from the ground state for $U_{235}$ to the intermediate excited level 86 may be found in the literature such as La-4501 *Present Status of the Analyses of the First and Second Spectra of Uranium (VI and VII) as Derived from Measurements of Optical Spectra;* Los Alamos Scientific Laboratory of the University of California, available from National Technical Information Service, U.S. Department of Commerce, 5285 Port Royal Road, Springfield, Va. Relatively efficient dye lasers can exist at frequencies for this purpose using xanthene dyes such as rhodamine 6G in an alcohol or distilled water solution for the lasing medium 30.

In producing second and third energy transitions 88 and 90 in FIG. 4, it is possible to use a single second laser system 28, as shown in FIG. 1, tuned generally to a frequency for producing the transition 88 between first and second real excited levels 86 and 92 for $U_{235}$ and in doing so to cross the energy level 76. It is of course important in this case that the energy of transition 88 be at least half the remaining energy required to ionize and the energy for both energy steps be less than half the ionization energy. The second transition 90 by the second laser system 28 will then have been selected to ionize atoms of $U_{235}$ excited to the second intermediate level 92. It is also possible to employ more than one laser and radiation frequency for laser system 28.

The second laser system 28 may also be operated in the red-orange portion of the visible spectrum. This permits a relatively powerful, high photon density beam from the second laser to compensate for the smaller cross-section for the ionization transition 90. While the high photon density from the second laser increases the probability of two-photon interactions for the undesired $U_{238}$ isotope, it is still necessary to produce a three-photon interaction if substantial ionization of $U_{238}$ is to be achieved. The probability for this three-photon reaction is low. Additionally, experimentation indicates a significant improvement in the separation factor using the three-photon interaction scheme of FIG. 4.

As indicated it is desirable to adjust the radiation frequency from the second laser 28 to match a real energy transition for the $U_{235}$ isotope between intermediate energy levels. An appropriate radiation frequency for such an interaction can be determined experimentally by known techniques such as adjusting the frequency of radiation from laser system 28 until an absorption line is observed spectroscopically or otherwise.

Known lifetimes for uranium atoms excited to intermediate energy levels are typically a significant fraction of a microsecond. Accordingly it has been found desirable to simultaneously provide radiation from the two laser systems 26 and 28 to minimize the losses resulting from decay of the excited states. A timer 95 may be provided in the system of FIG. 1 to simultaneously activate the timer 36 of the two laser systems 26 and 28 to provide coincident radiation in the beam 42 for a duration which is a significant fraction of a microsecond. Directly subsequent to the application of the laser energy, timer 95 activates the electric field excitation source 66 to produce the crossed-field acceleration forces. This energization is typically repeated periodically at intervals such that all atoms in the vapor beam 60 are exposed at least once to ionizing laser radiations.

It can here be appreciated how the system of the present invention provides for selective ionization and ultimately separation of the $U_{235}$ isotope of uranium without creating conditions which permit significant ionization of the undesired $U_{238}$ isotope by using a three stop ionization technique where each energy step is less than one half of the energy for ionization. The technique can clearly be applied to separating other isotopes as well, even though their ionization energies differ from those for uranium. Moreover, it should be clear that the technique of selective ionization may be applied to particles in general including atoms and molecules.

Having described above a preferred structure and method for the improved selective ionization of the $U_{235}$ isotope of uranium, it will occur to those skilled in the art that various modifications and alterations can be made without departing from the spirit of the invention. Accordingly, it is intended to limit the scope of the invention only as indicated in the following claims.

What is claimed is:

1. In a technique for isotopically selective ionization, a method for selectively exciting an isotope in an environment containing plural isotopes, said exciting method including the steps of:
    applying to said plural isotopes in said environment a first radiant energy;
    providing a photon energy for said first radiant energy which is less than half of the energy of ionization of said isotopes in an unexcited state to produce an energy step for said one isotope to a first excited energy state;
    applying to said plural isotopes in said environment a second radiant energy to produce at least excitation of said one isotope in a further energy step to a second excited energy state; and
    providing a photon energy for said second radiant energy which is less than half the ionization energy of said plural isotopes thereby necessitating at least three energy steps to ionize the particles of said plural isotopes.

2. The method for selectively exciting an isotope of claim 1 further including the step of:
    establishing the frequency of said first radiant energy at a predetermined frequency corresponding to a predetermined energy quantum step for said one isotope in said environment to said first excited energy state.

3. The method of claim 1 wherein said first and second radiant energies are applied simultaneously.

4. The method of claim 1 including the steps of:
    providing a vapor comprising the $U_{235}$ and $U_{238}$ isotopes of uranium to define said environment; and
    establishing the frequency of said first radiant energy to correspond to an absorption line for the $U_{235}$ isotope of uranium.

5. The method of claim 1 wherein said first radiant energy is the output of a tunable dye laser in approximately the red-orange portion of the visible spectrum.

6. The method of claim 5 further including the steps of deriving said second radiant energy from the output of a tunable dye laser in approximately the red-orange portion of the visible spectrum.

7. The method of claim 1 further including the steps of:
    producing ionization of said one isotope from said second excited energy state through a further energy step; and
    collectng the ions of said one isotope resulting from said ionization producing step in a concentration substantially greater than the concentration of said one isotope in the unexcited condition of said environment.

8. The method of claim 1 further including the step of providing a vapor of said plural isotopes to define said environment.

9. The method of claim 1 further including the step of providing said second radiant energy at a preset frequency which corresponds to an energy transition for said one isotope between said first excited energy state and a real, second excited energy state.

10. The method of claim 9 wherein said providing step includes the step of determining said preset frequency as the frequency corresponding to observed radiation absorption.

11. The method of claim 1 wherein said last mentioned applying step includes the step of providing in said second radiant energy a photon density sufficient to produce a two-photon ionization of said one isotope from said first excited state.

12. A method for selectively exciting one isotope in an environment containing plural isotopes including the steps of:
 applying to said isotopes in said environment a first radiant energy to produce at least one energy jump for said one isotope to a first excited energy level;
 providing the photon energy for said first radiant energy at an energy level less than half of the energy of ionization of said isotopes in an unexcited state;
 exposing the isotopes in said environment to second radiant energy;
 establishing the energy of photons in said second radiation to be less than one half of the ionization energy of said isotopes;
 providing in said second radiant energy a photon density sufficient to produce two photon interactions with said one isotope; and
 producing in said one isotope a second energy jump from said first excited energy level to a second excited energy level and a third energy jump from said second excited energy level to ionization in response to the photons of said second radiant energy.

13. The method for selectively ionizing isotopes of claim 12 further including the step of providing the energy for at least a portion of the photons in said second radiant energy to correspond to a discrete energy transition for said one isotope between the first excited energy level produced by said first radiation and the excited energy level.

14. In a system for isotope separation, a method for selectively ionizing particles comprising one isotope type in an environment which includes particles of plural isotope types, said method comprising the steps of:
 producing a first transition in particles of said first isotope type from an approximately ground energy level to a first excited state;
 establishing the energy change for said first transition to be less than one half of the ionization energy of the particles of said plural isotopes;
 producing a second transition in said particles from the energy level of said first excited state to a second energy level of a second excited state;
 establishing the energy change for said second transition to be less than one half of the energy of ionization for the particles of said plural isotopes;
 producing a third transition in said particles from the energy level of said second excited state to at least the ionization energy of the particles of said one isotope;
 establishing the energy change for said third transition to be less than one half of the ionization energy of the particles of said plural isotopes; and
 further establishing the energy change for said first transition to provide excitation of the particles of said one isotope without corresponding excitation of the other particles of said plural isotopes.

15. The method for selectively ionizing particles of claim 14 further including the step of establishing the energy change for said second transition to correspond to a selective excitation of the particles of said one isotope from said first excited state to said second excited state without corresponding excitation of the other particles of said plural isotopes.

16. Apparatus for selectively exciting one isotope in an environment of plural isotopes to provide an increased proportion of the selectively excited isotope in the ionized state than in the unionized state, said system including:
 first means for applying a first radiant energy to said environment;
 second means for applying to said isotopes in said environment a second radiant energy;
 means for controlling the energy of photons in each of said first and second radiant energies at energy levels less than one half of the energy of ionization for said isotopes such that at least three photons of energy selected from said first and second radiant energies are required to reach the ionization energy of said isotopes from an unexcited state and thereby necessitating at least three energy steps to ionize the particles of said plural isotopes.

17. The apparatus for selectively exciting of claim 16 wherein:
 said first applying means includes a tunable dye laser; and
 said control means includes a tuning system for said tunable dye laser.

18. The apparatus for selectively exciting of claim 17 wherein said tunable dye laser includes a lasing medium having rhodamine 6G.

19. The apparatus for selectively exciting of claim 16 wherein said isotopes include the isotopes of uranium and said one isotope is $U_{235}$.

20. The apparatus for selectively exciting of claim 16 further including:
 means for applying a magnetic field to the environment of said plural isotopes; and
 means for applying an electric field to said environment of said plural isotopes with a component orthogonal to said magnetic field to accelerate the selectively ionized isotopes for separation from said environment.

21. The apparatus for selectively exciting of claim 16 further including means for providing a vapor of uranium as said environment of plural isotopes.

22. The apparatus for selectively exciting of claim 16 wherein said control means includes means for providing the frequency of said first radiant energy at a frequency corresponding to a predetermined, isotopically selective energy transition for said one isotope to a first excited energy state.

23. The apparatus for selectively exciting of claim 16 wherein said control means includes means for providing a preset energy for the photons in said second radiant energy corresponding to a discrete isotopically selective energy transition for said one isotope between a first energy state and a real, second excited energy state.

24. The apparatus for selectively exciting of claim 16 further including means for accelerating the selectively ionized one isotope for separation thereof.

25. In a system for isotope separation by isotopically selective ionization, apparatus for selectively exciting an isotope in an environment containing plural isotopes, one isotope of which is to be separated from the plural isotopes, said apparatus including:
  first means for applying a first radiant energy to the isotopes, in said environment;
  said first means including means for providing in said first radiation a predetermined photon energy less than one half of the ionizing energy for said isotopes to produce excitation of said one isotope in an energy step to a first excited state without corresponding exciting of another isotope in said environment;
  second means for applying a second radiant energy to the isotopes in said environment;
  said second means including means for providing in said second radiation a predetermined photon energy less than one half of the ionizing energy for said isotopes to produce excitation of said first isotope from said first excited state in a further energy step to a second state thereby necessitating at least three energy steps to ionize any of said plural isotopes.

26. The apparatus of claim 25 wherein said second means includes means for producing a photon density in said second radiant energy sufficient to produce two-photon interaction with said one isotope at said first excited state thereby to produce excitation thereof to said second excited state and subsequently to the ionized state.

27. The apparatus of claim 25 wherein said second means includes means for providing a narrow range of photon energy in said second radiant energy corresponding to the energy change between said first and second excited states for said one isotope but not generally corresponding to a discrete energy change for another isotope in said environment.

* * * * *